United States Patent [19]
Gordon et al.

[11] Patent Number: 5,227,935
[45] Date of Patent: Jul. 13, 1993

[54] TAPE DRIVE HAVING A SELECTIVELY RETRACTABLE DRIVE HUB

[75] Inventors: Norman Gordon; Robert V. Elliott; Charles W. Donkin, all of Wells; Aubrey E. Corbett, Warwickshire, all of Great Britain

[73] Assignee: M4 Data Limited, Somerset, Great Britain

[21] Appl. No.: 602,262

[22] PCT Filed: May 4, 1989

[86] PCT No.: PCT/GB89/00472
§ 371 Date: Dec. 24, 1990
§ 102(e) Date: Dec. 24, 1990

[87] PCT Pub. No.: WO89/11148
PCT Pub. Date: Nov. 16, 1989

[51] Int. Cl.⁵ .............................................. G11B 5/008
[52] U.S. Cl. ...................................... 360/95; 360/96.5
[58] Field of Search ............... 360/93, 95, 96.1–96.6; 242/72 R, 67.2 R, 67.3 R, 195, 197–203

[56] References Cited

U.S. PATENT DOCUMENTS

| | | | |
|---|---|---|---|
| 3,724,778 | 4/1973 | Kuhnlein | 360/96.6 X |
| 4,337,490 | 6/1982 | Komimura | 360/96.6 |
| 5,032,940 | 7/1991 | Watanabe | 360/96.3 X |

Primary Examiner—A. J. Heinz
Attorney, Agent, or Firm—Fay, Sharpe, Beall, Fagan, Minnich & McKee

[57] ABSTRACT

In order to enable a tape drive machine to be constructed in a housing (30) with low height, a hub (36) which in operation projects from a drive motor (34) into a tape cartridge (10) is retractable into the motor (34) to permit the cartridge (10) to be slid out from the machine in the edgewise direction. In an alternative embodiment, the motor and hub can be slid part-way out of the housing (30). A tape drive machine also discloses indexing of a tape drive head, a path for the tape, threading of the tape, the drive motor, construction of a motor stator, and detection of the beginning and end of tape.

19 Claims, 10 Drawing Sheets

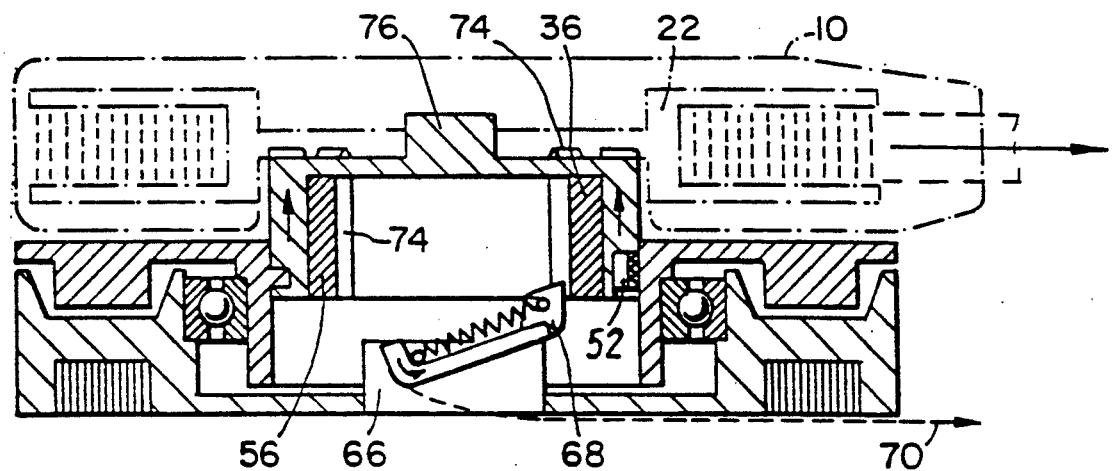
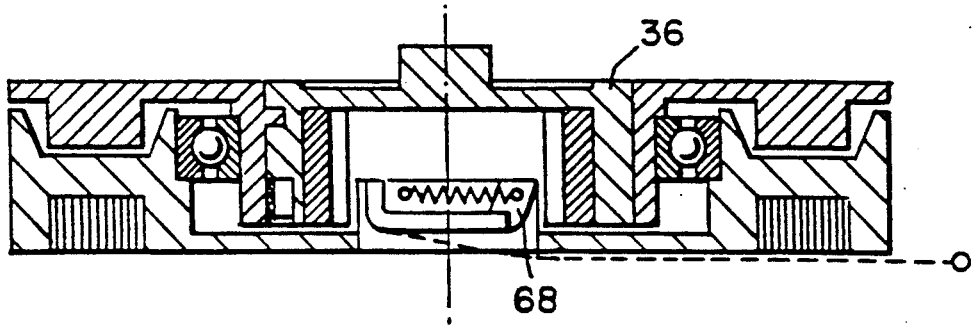

TAPE DRIVE HAVING A SELECTIVELY RETRACTABLE DRIVE HUB

1. INTRODUCTION

This invention relates to tape drive machines for magnetic or optical tape, or other types of data storage tape. Various aspects of the invention are concerned with loading a cartridge into a tape drive machine, a hub of a tape drive motor, indexing of a tape drive head, an improved tape path through a tape drive machine, threading of the tape into the tape drive machine, a tape drive motor, a construction of motor stator and a dual performance motor. In this specification, the tape drive apparatus is described in one particular orientation, but the claims should be interpreted to cover the apparatus whether in that orientation or bodily turned, for example, through a right angle.

1.1 Cartridge Loading

This aspect of the invention is particularly concerned with a tape drive for use with a single reel 5"×4"×1" (127 mm×102 mm×25 mm) (nominal sizes) tape cartridge according to, for example, specification IBM GS 32-0048-0, ECMA 120 or ANSI X3B5-87-037. An example of such a product is the IBM 3480 cartridge. Such a cartridge is shown schematically in FIGS. 1A to 1C. The cartridge has a generally flat rectangular housing 10 with upper and lower faces 12, 14 and a peripheral wall 16. At one corner 16 of the housing, a leader block 18 is a snap-fit in the housing, and, in use, the block 18, to which one end of the tape is attached, is unclipped from the housing and is used to withdraw the end of the tape and thread the tape through the tape drive machine and onto a take-up reel. The lower face 14 of the housing has a circular aperture 20 which provides access to a supply reel drive member 22 having a ring of teeth 24. A locking button 26 is formed at the center of the drive member 22. In use, a supply reel hub of the tape drive machine depresses the drive member 22 upwardly into the housing by about 4 mm, and dogs on the supply reel hub engage the teeth 24. Furthermore, a release member on the supply reel hub engages the locking button 26 and depresses it a further 2 mm or so. The supply reel can then rotate in housing 10 and be driven by the supply reel hub through the action of the interengaging dogs and teeth 24.

It is known to provide the tape drive machine in what is termed a 5¼" profile industry standard enclosure, which is so called because it was the size of the enclosure for the initial 5¼" floppy disc drives. Such an enclosure measures 8"×5.75"×3.25" (203 mm×146 mm×83 mm) excluding any fascia. A typical method of loading a 5"×4"×1" tape cartridge into such an enclosure is illustrated in FIG. 2. In that drawing, reference numeral 30 denotes the enclosure, which has an aperture 32 in the front panel to receive the cartridge 10 edgeways. A supply reel motor 34 with a drive hub 36 is mounted in the enclosure 30. As the cartridge is slid in edgeways, it is guided for movement along the path indicated by the chain dot lines from position 10(1), through position 10(2) to operating position 10(3), as shown in dashed lines. It will be noted that the cartridge drops downwardly onto the supply reel hub 36 between position 10(2) and 10(3), and this movement is essential to enable the hub 36 to take up engagement with the drive member in the cartridge.

One design desideratum is to make computer equipment as small as possible, but a restraint on this is the need to fit in with existing industry standards. Developments in the design of floppy disc drives have now enabled a drive to be manufactured in an enclosure which is half of the height of the original industry standard. This is termed a half-height 5¼" profile enclosure and thus enables two floppy disc drives to be stacked in the space of a previous full-height 5¼" profile enclosure. The nominal dimensions of the half-height 5¼" profile are 8"×5.75"×1.625" (203 mm×146 mm×41 mm).

Consideration has been given to shrinking the size of a 5×4×1 cartridge drive so that it fits into the half-height 5¼" profile, but without any success. Indeed, referring to an article in "Systems International" December 1984 relating to developments in the tape drive industry, it is said on page 48:

> "How small a package will the IBM cartridge fit into? . . . A 5×4×1 . . . will easily fit into a standard 8 in footprint with desirable performance parameters, but it will certainly not fit into a half-high 5¼ in footprint with present technology feasabilities. Whether it will fit into a full-high 5¼ footprint will be decided by the ingenuity of the OEM drive manufacturers".

One of the most significant problems with fitting a 5"×4"×1" drive into a half-height 5¼" profile is the height limitation. The height of the profile is 41.3 mm. With 1 mm thick top and bottom housing plates, the interior height is 39.3 mm. The cartridge height is 25.2 mm, which leaves 14.1 mm spare to accommodate the height of the supply reel motor and the hub, and to provide necessary clearances. The hub and release button have to protrude about 8 mm above the motor, and with 1 mm being left for clearance, this enables a motor of only 5.1 mm in height to be used. With present technology, it has not been possible to construct a motor of this height with the required drive characteristics.

The first aspect of the invention is concerned with providing solutions to problem set out above.

One solution to the problem in accordance with the invention is provided by a tape drive comprising a housing defining a space to receive a cartridge in an operating position, a motor having a body disposed in the drive housing directly below the bottom wall of a cartridge disposed in the operating position, a drive hub projecting from the motor into the cartridge receiving space to engage and drive the hub receiving member of a cartridge disposed in the operating position, and means to retract the drive hub into the motor to permit a cartridge to be withdrawn from the operating position substantially by sliding movement only in an edgewise direction of the cartridge.

Another solution to the problem in accordance with the invention is provided by a tape drive comprising a housing defining a space to receive a cartridge in an operating position, a motor having a body disposed in the drive housing directly below the bottom wall of a cartridge disposed in the operating position, a drive hub projecting from the motor into the cartridge receiving space to engage and drive the hub receiving member of a cartridge disposed in the operating position and means to guide the motor, drive hub and a cartridge disposed in the operating position substantially for sliding movement only in an edgewise direction of the cartridge to permit the cartridge to be withdrawn from the operating position to a position in which the majority of the cartridge is outside of the housing.

Both of the solutions, therefore, provide a tape drive which includes a means to permit a cartridge to be withdrawn from the operating position to a position in which at least the majority of the cartridge is outside of the housing substantially by sliding movement only in an edgewise direction of the cartridge.

1.2 Drive Hub

For use with the arrangement employing a retractable drive hub, the present invention provides, according to a further aspect thereof, a drive mechanism comprising a motor having an annular rotor, a tape reel drive hub mounted within the rotor, means to cause the hub to move in opposite axial directions between first and second axial positions with respect to the rotor upon relative rotation of the hub and rotor in first and second opposite directions, and means selectable to lock the hub in at least the first of said axial positions so that rotary drive can be transferred from the rotor to the hub.

The means to cause the hub to move axially preferably comprises a screw thread or the like acting between the hub and the rotor. In one example, at least one projection may be provided on one of the rotor and the hub engaging in a complementary groove in the other or the rotor and the hub. In another example, both the rotor and the hub are formed with grooves, with balls being provided to run in the associated grooves to provide a screw-drive action.

The mechanism is preferably arranged so that the hub is prevented from moving from the second axial position past the first axial position with respect to the rotor, the locking means comprising a brake operable to prevent relative rotation between the hub and the rotor in the direction which will cause the hub to move from the first to the second axial position with respect to the rotor.

1.3 Head Indexing

It is common to record data on a magnetic tape in a plurality of tracks spaced apart across the width of the tape. In order to write to or read from the plurality of tracks, either a multi-track head may be used, or alternatively a single track head may indexed across the width of the tape to the appropriate position. The drive to move the head may be provided by a stepper motor, or a DC motor and encoder, and an appropriate gear mechanism. It is also common to provide for azimuth adjustment of the head. In a basic arrangement, a manual azimuth adjustment is provided, and the azimuth angle of the head is set when the machine is built, and can be adjusted when the machine is serviced.

This aspect of the invention is concerned with enabling a more compact arrangement to be provided to serve the purpose of indexing the head across the tape and also adjusting the azimuth angle of the head. In accordance with this aspect of the invention, there is provided a data head indexing system comprising a reversible motor, and first and second mechanisms driven by the motor for indexing first and second portions, respectively, of the head in opposite directions across a recording medium, the first mechanism incorporating a backlash device so that, as the mechanisms drive the head in unison, the head is bodily moved across the recording medium, but so that, as the backlash of the backlash device is being taken up, the second mechanism alone moves the first portion of the head to adjust the azimuth angle of the head relative to the recording medium. Thus, the system provides for indexing and azimuth adjustment with the use of only a single motor.

The system preferably also includes means for controlling the motor, the control means being operable when moving the head in one direction to cause the motor to drive the second mechanism in one direction and take up the backlash in the first mechanism and then to drive the first and second mechanisms in unison in said one direction to move the head in said one direction, and then to drive the second mechanism in the opposite direction while there is backlash in the first mechanism to achieve a desired azimuth angle of the head. Conversely, the control means is preferably operable when moving head in the opposite direction to cause the motor to drive the second mechanism in the opposite direction and take up backlash in the first mechanism and then to drive the first and second mechanisms in unison in said opposite direction to move the head in said opposite direction, and then to drive the second mechanism in said one direction whilst there is backlash in the first mechanism to achieve a desired azimuth angle of the head.

1.4 Tape Drive Motor

This aspect of the invention is concerned with providing a motor of small axial length, thus making the motor particularly suitable for fitting into a half-height 5 ¼" profile between the tape cartridge and the bottom plate of the enclosure.

Typically, the rotor of an electric motor is mounted in the motor housing by two bearings, and for precision motors, it is also necessary to provide some means, such as a spring or shims, to take up any end play in the rotor.

In order to enable the axial length of the motor to be shortened, this aspect of the invention provides an electric motor comprising a stator and a rotor, the rotor being mounted to the stator by a single bearing assembly, and the arrangement being such that, in operation, the magnetic field acting between the stator and the rotor has a substantial component in the axial direction of the rotor, so that the rotor exerts an axial force on the bearing.

Preferably, the bearing is a ball bearing assembly. Any play between the balls and the raceways of the bearing assembly, which would otherwise allow axial movement and tilting of the rotor relative to the strator, is taken up when the motor is operational by the axial component of the magnetic field.

Preferably, the diameter of the bearing assembly is a substantial proportion such as at least a quarter, and more preferably about one half, of the overall diametrical size of the motor, in order to reduce the possible tilting of rotor. The balls of the bearing are preferably of small diameter relative to the diameter of the path they follow, for example in the ratio of 1:10, or less.

1.5 Stator Construction

This aspect of the invention is concerned with constructing a stator winding assembly for use in a flat profile motor. The method comprises the steps of arranging a plurality of winding coils in a first ring as a first tier, arranging a further plurality of winding coils in a second ring as a second tier on the first tier so that the windings of the second tier are angularly off-set relative to the windings of the first tier. This aspect of the invention is characterised in that the two tiers are pressed together to deform the windings so that portions of the windings of each tier are interleaved with portions of the windings of the other tier. The windings are then secured together.

This construction method provides a compact and strong stator assembly.

The stator may be constructed from more than two tiers following the principles described above.

Preferably, the winding coils are coated with a heat-curable material prior to arranging the coils in the tiers, and after pressing the coils together the assembly is heated in order to cure the material and thus bond the winding coils together. A dough moulding compound (DMC) or other form of encapsulation ensures a rigid structure.

1.6 Tape Edge Detection

It is known in a tape drive machine to attempt to ensure that the position of the head transversely across the tape is accurately set by guiding one edge of the tape with respect to a reference surface such as a fixed flange on a roller which also has a light spring-loaded flange so that the opposite edges of the tape are squeezed between the flanges. The position of the head is set with respect to the reference flange or a further reference surface fixed with respect to the reference flange. A problem with this known arrangement is that errors can still arise, for example, due to the tape not being fed in a direction perpendicular to the axis of the roller. Also the spring loaded flange of the reference roller tends to damage or increase wear of the tape.

In accordance with this aspect of the invention there is provided a tape drive machine comprising a head, means to drive a tape from one reel to another past the head, means to detect the position of an edge of the tape in a direction transverse to the tape at a location adjacent the head and means to adjust the transverse position of the head and the tape relative to each other in dependence upon the sensed edge position.

In a preferred embodiment, the detecting means comprises means to project a beam of light across the edge of the tape, and a light sensor arranged to sense the beam and such that the tape casts a shadow on the sensor, the sensor producing an output signal dependent upon the position of the shadow on the sensor. Preferably the distance between the tape and the sensor is substantially greater than that between the source and the tape, so that movement of tape in the transverse direction is amplified as movement of the shadow. For further sensitivity, the beam preferably has a small dimension in the direction transverse to the tape at the source of the beam and diverges from the source. Conveniently, the source of the beam may be a laser diode. The sensor may include means to compensate for variations in the intensity of the beam.

1.7 Beginning and/or End of Tape Detection

It is necessary in a tape machine to be able to detect when the beginning of the tape is approaching on reverse wind, or the end of the tape is approaching on forward wind. In one known method, the stations of the supply and/or take-up reel are counted up and down, and nearing of the beginning or end of the tape can then be determined. This method has the drawback, however, that in the case of power loss, the count will also be lost unless a non-volatile memory is employed. If the count is lost, then the machine must be operated at very low speed to return to the beginning of the tape where some other means may be utilised to detect the very beginning of the tape, such as data written on the tape, a sensor which detects a reflective end portion of the tape, or the leader block being pulled out of its recess in the take-up reel.

In accordance with this aspect of the invention, there is provided a tape drive machine operable to wind tape between a pair of reels and having:
means to provide a signal indicative of the linear speed of the tape between the two reels;
means to provide a signal indicative of the angular speed of one of the reels; and
means to determine from the tape speed signal and the reel speed signal, when less than a predetermined amount of tape remains on said one reel.

Because there is a predetermined relation between the angular speed of the reel and the linear speed of the tape when the reel is empty (i.e. the linear speed is equal to the reel radius multiplied by the angular speed), the beginning or end of tape can be detected without needing to count the reel revolutions.

Preferably, the machine further comprises means to provide a signal indicative of the angular speed of the other reel, and means to determine, from the tape speed signal and the other reel speed signal, when a predetermined amount of tape remains on said other reel. Thus both the beginning and end of the tape can be simply detected.

The machine may further comprise means to control rotation of the reels in dependence upon result of the determination(s) made by the determining means. For example, upon a fast rewind operation the reels may be reduced to a slow speed when the beginning of the tape is detected, and upon a fast forward winding operation the reels may be reduced to a slow speed when the end of the tape is detected.

1.8 Last Turn Detection

As mentioned above, it is known to detect when the very beginning of the tape is reached either by marker data written on the tape or a sensor which senses a reflective portion at the end of the tape. The marker data method therefore requires the tape to be read as it is being rewound. The reflective portion method requires the tape to be specially manufactured to include a reflective portion or requires a reflective label to be affixed to the tape.

In accordance with this aspect of the invention, there is provided a tape drive machine operable to wind tape between a pair of reels and comprising means to detect when the tape does not cover part of one of the reels. Thus, the only requirement of the tape is that it is not light transmissive, which is generally the case. When the last turn of the reel is reached, the tape uncovers said part of the reel and the detection is then made.

Preferably, the detecting means comprises means to project a beam of light along a path which includes a passageway through said part of the reel, and means to determine when the light path is cut by the tape.

The last turn detection may be conveniently used with a means to control rotation of the reels in dependence upon the detection made by the detection means.

This aspect of the invention is preferably used in conjunction with the beginning of tape detection method described above at Section 1.7.

Various combinations of the above described aspects of the invention may, of course, be embodied in the same machine.

2. LIST OF DRAWINGS

Specific embodiments of the invention will now be described by way of example with reference to the accompanying drawings, in which:

FIGS. 8A and 8B are side views illustrating the drive mechanism;

Figure 12:
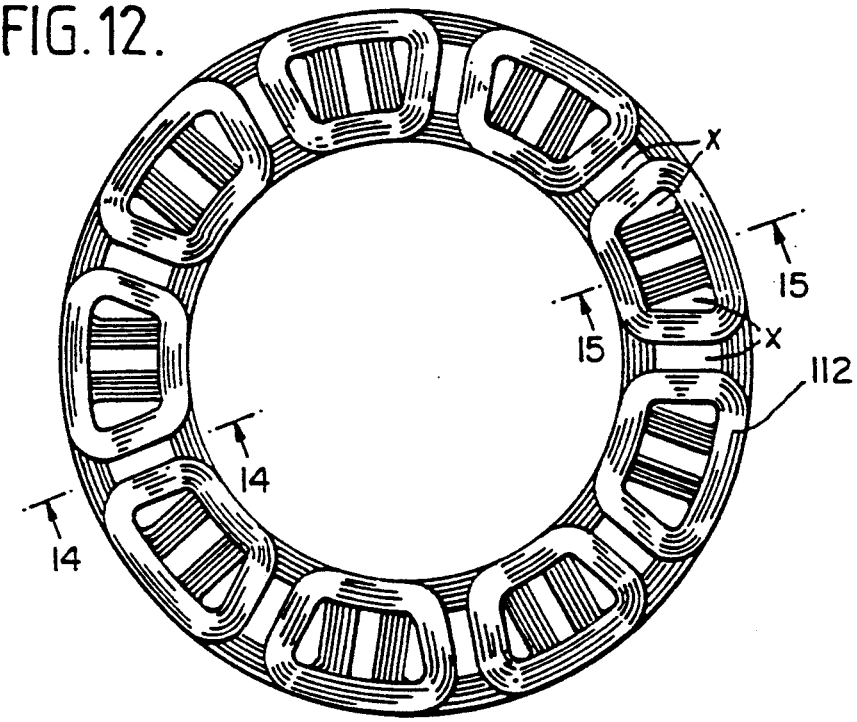
FIG. 12 is a plan view of the winding arrangement of the motor.
Figure 13:
FIG. 13 is a side view of the winding arrangements.
Figure 14:
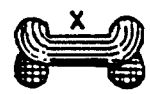
Figure 15:
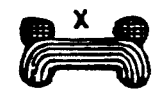

FIGS. 14 and 15 are sectional views of the winding arrangement taken along the section lines 14—14 and 15—15, respectively, as shown in FIG. 12.

Figure 16:
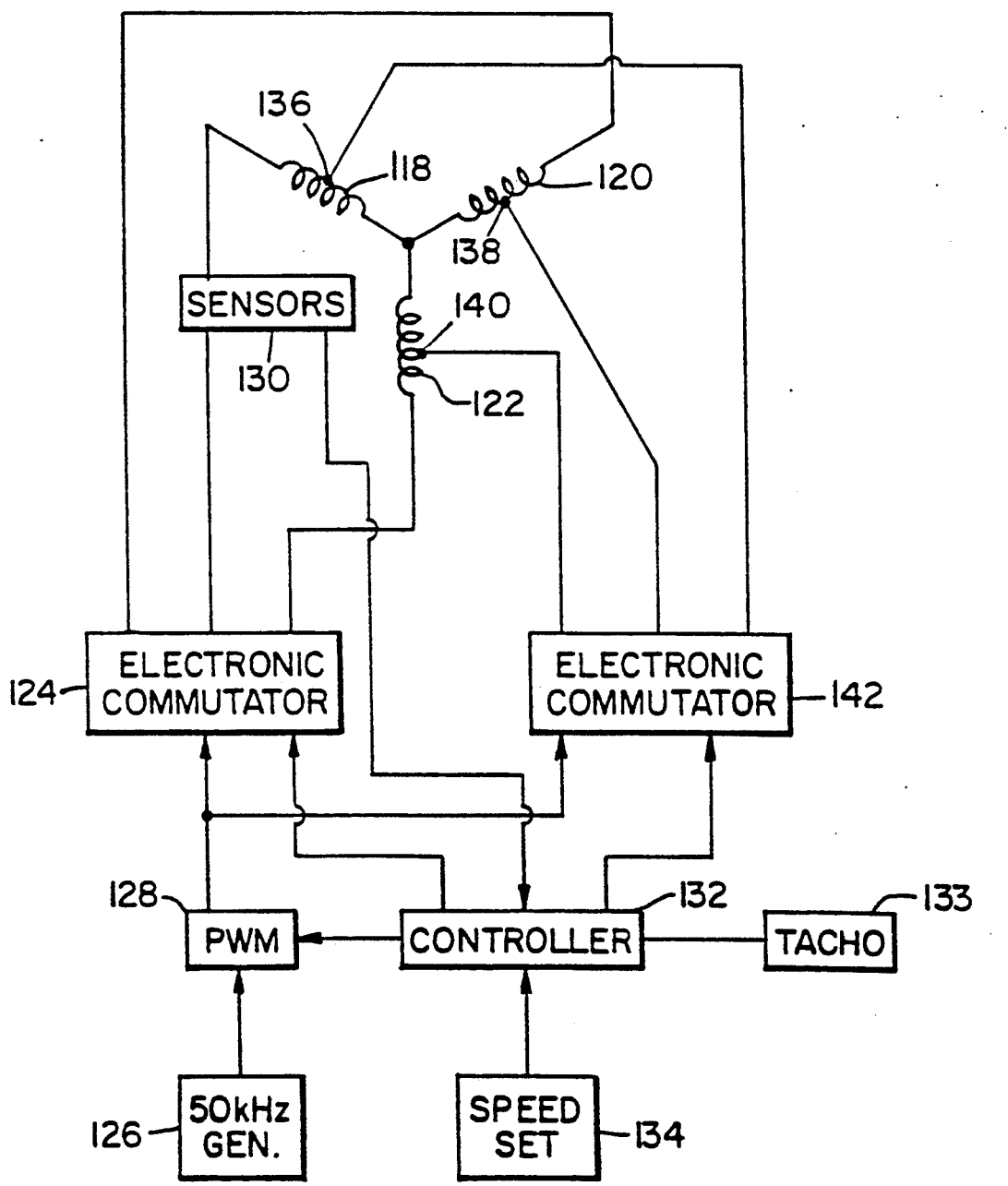
Figure 17:
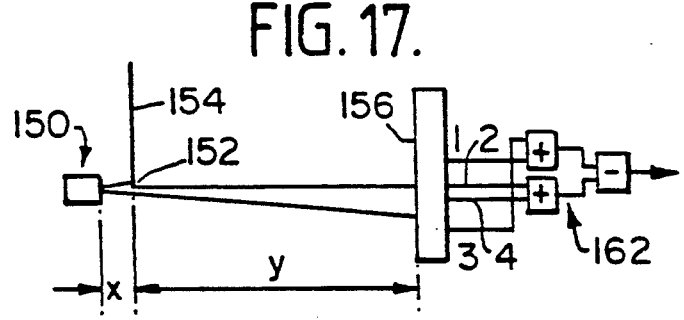
Figure 18:
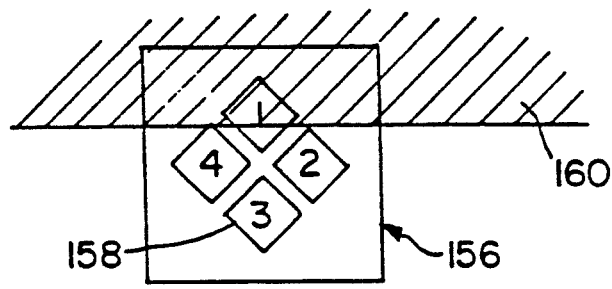
Figure 19:
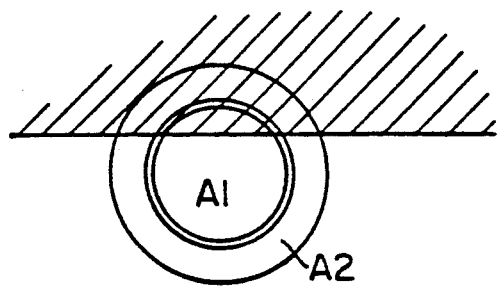

FIG. 16 is a block diagram illustrating the manner of control of the motor;

FIG. 17 is a schematic diagram illustrating a tape sensing arrangement;

FIG. 18 shows a photo-sensor array used in the arrangement of FIG. 17;

FIG. 19 shows an alternative photo-sensor; and

Figure 20:
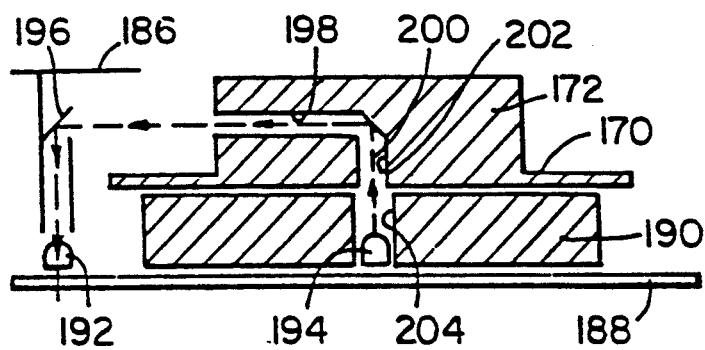

FIG. 20 is a sectioned elevation of a take-up reel showing an last turn sensor.

3. DESCRIPTION OF THE EMBODIMENTS

3.1 Cartridge Loading

Figure 1A:
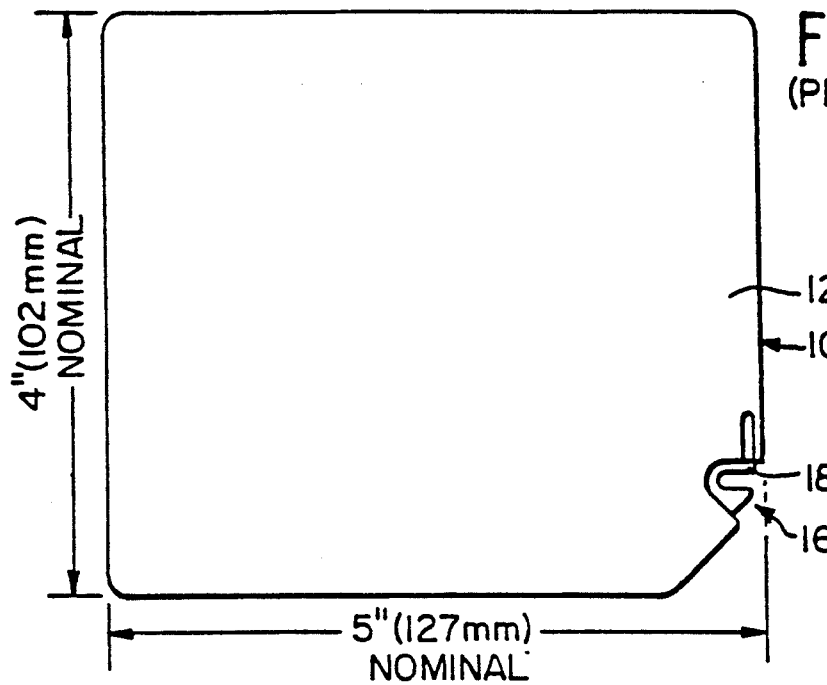
FIGS. 1A, 1B and 1C are plan, side and under plan views, respectively, of a 4"×5"×1" tape cartridge.
Figure 1B:
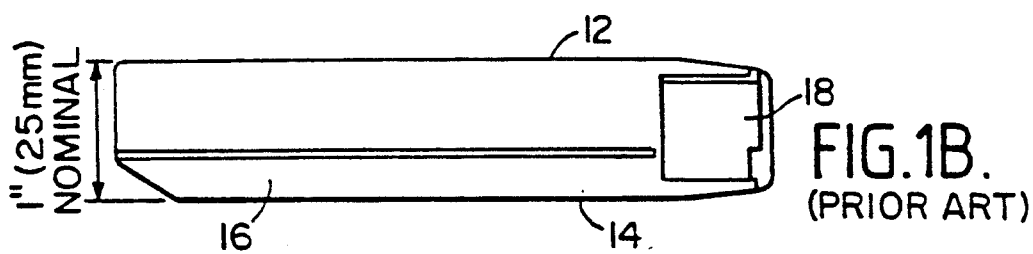
Figure 1C:
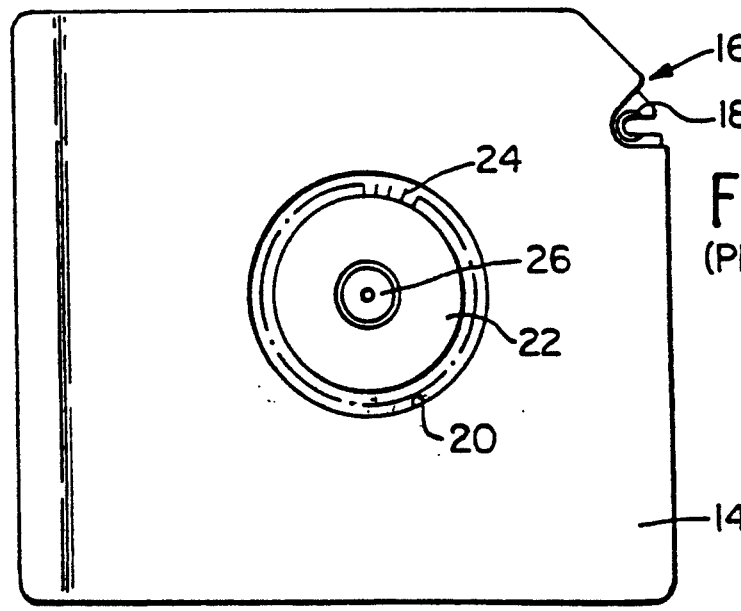
Figure 2:
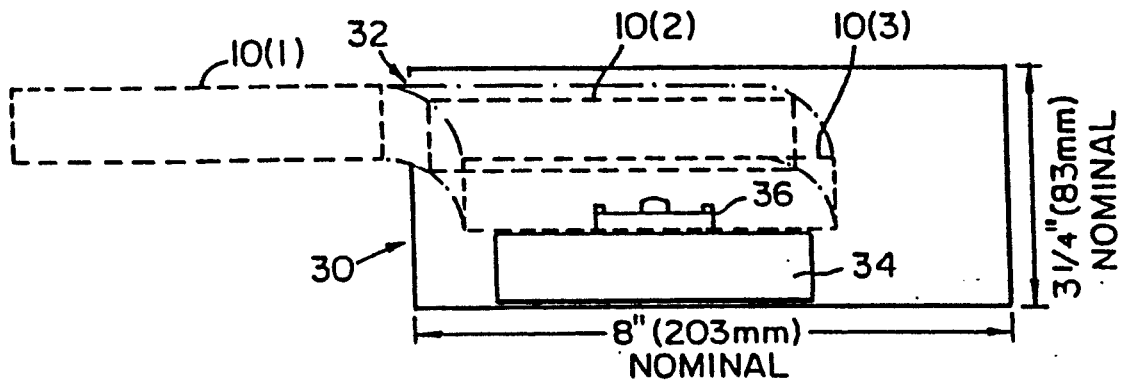
FIG. 2 is a schematic side view of a known tape drive mechanism.
Figure 3:
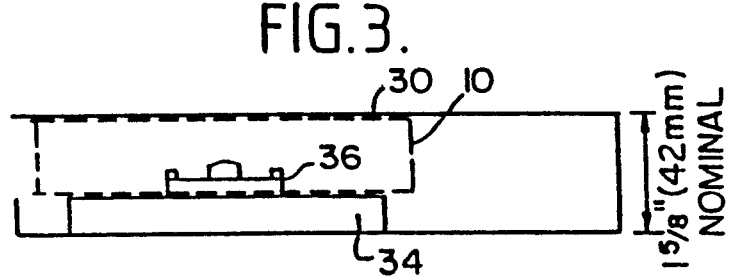
FIG. 3 is a schematic side view of a tape drive machine in accordance with the invention, with a tape cartridge shown in the operative position.

Referring to FIG. 3, the enclosure of a tape drive machine according to the invention has a nominal height of 41 mm. A low height motor 34 is mounted adjacent the floor of the housing 30, and a drive hub 36 projects upwardly from the motor 34 into engagement with the drive receiving member 22 of a standard cartridge disposed in an operating position, as shown in dashed lines in FIG. 3, in the enclosure 30.

Figure 4:
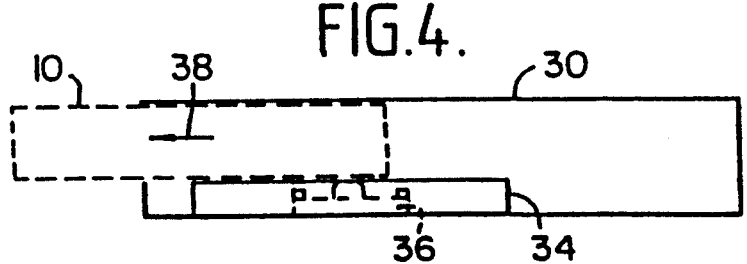
FIG. 4 is a view similar to FIG. 3, but showing a tape cartridge partially withdrawn, using one system according to the invention.

Referring to FIG. 4, in accordance with one embodiment of the invention, the drive hub 36 can be retracted into the height of the motor 34, and thus the tape cartridge 10 can be withdrawn from the enclosure 30 solely by movement in the edgeways direction, as denoted by arrow 38, and a different cartridge can then be loaded into the enclosure 30, whereupon the drive hub 36 is raised into engagement with the replacement cartridge.

Figure 5:
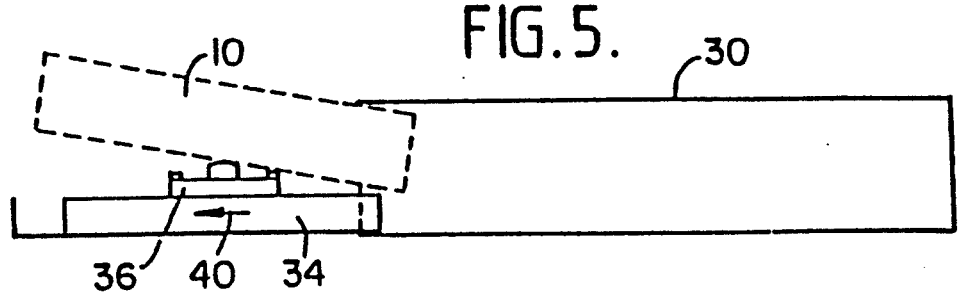
FIG. 5 is a view similar to FIG. 3, but showing a tape cartridge partially withdrawn, using another system according to the invention.

Referring to FIG. 5, in an alternative embodiment, the hub 36 is not retractable, but instead the motor 34, together with the hub 36 is mounted for sliding movement in the edgewise direction of the cartridge 10, as denoted by the arrow 40, to a position in which all or nearly all of the cartridge is disposed outside of the enclosure 30, whereupon the cartridge 10 can be lifted clear of the drive hub 36 and completely removed from the drive machine. A replacement cartridge can then be dropped onto the drive hub, and the motor 34, drive hub 36 and replacement cartridge 10 can then be slid into the machine in the direction opposite to arrow 40 to the position as shown in FIG. 3.

3.2 Drive Hub

Figure 6:
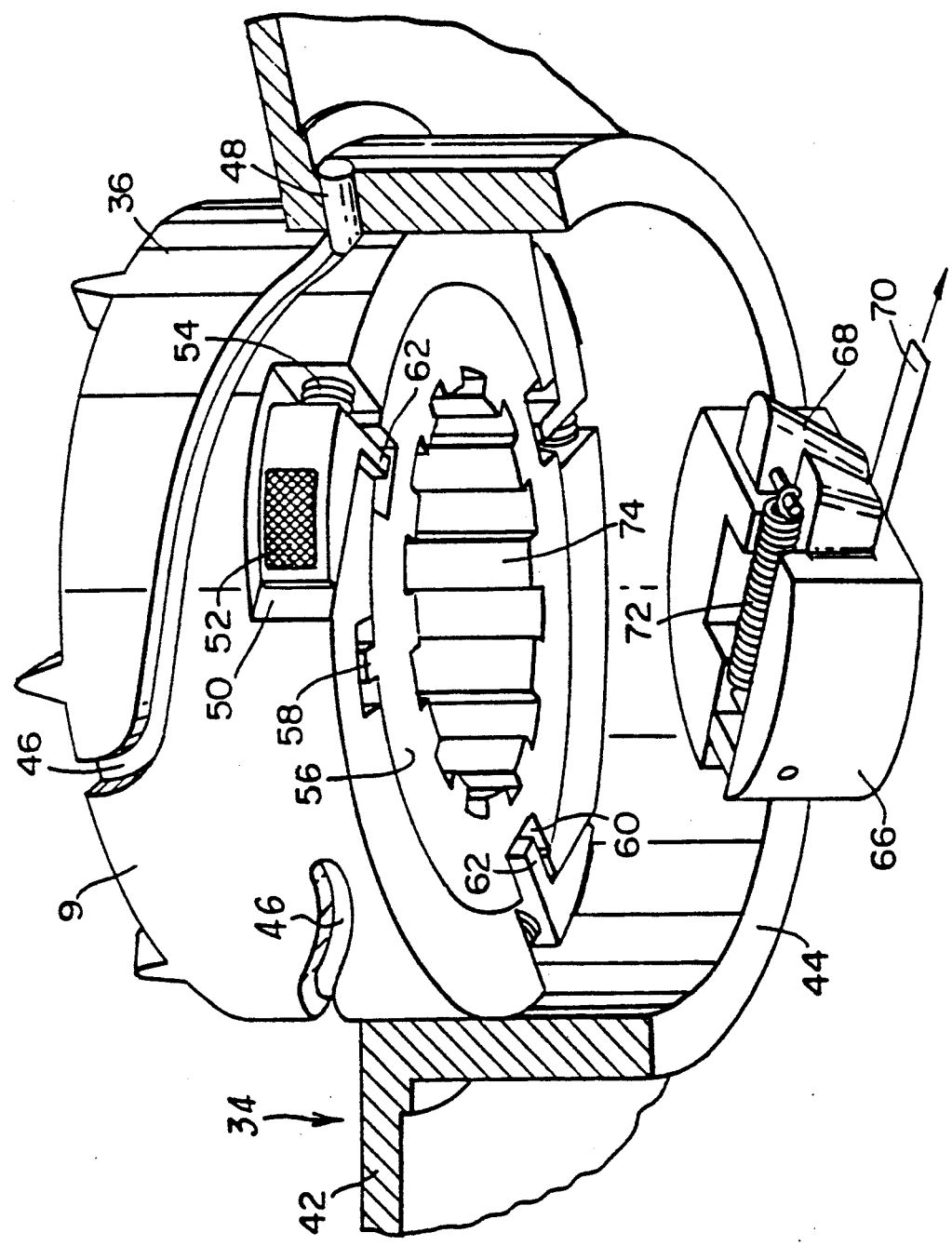
FIG. 6 is a partially cut-away perspective view, partly from below, of a drive hub retracting mechanism.

Referring to FIG. 6, the retracting hub mechanism described with reference to FIGS. 3 and 4 is illustrated. The motor 34 has an annular rotor 42 with a cylindrical wall 44. The drive hub 36 is generally cylindrical and is fitted within the cylindrical wall 44 of the rotor. The outer cylindrical surface of the drive hub 36 is formed with three somewhat helical grooves 46, and corresponding pins 48 project from the inner cylindrical surface of the annular rotor 42 into engagement with the grooves 46 so that relative rotational movement between the drive hub 36 and rotor 42 produces axial movement of the hub relative to the rotor. If need be, a further set of pins may be provided at a different axial position to the pins 48 so that for one portion of the axial movement of the hub 36 the pins 48 engage the grooves 46 and so that for another portion of the movement of the hub the further pins engage the grooves, there being an overlap when both sets of pins engage the grooves. In one alternative arrangement, the pins may be provided on the hub 36, rather than on the wall 44, and the grooves may be provided in the wall 44, rather than in the hub 36. In another alternative arrangement, grooves may be formed in the hub 36 and the wall 44, and balls may be provided between the grooves so that the arrangement acts as a ball screw. Three wedge shaped recesses are formed around the outer surface of the drive hub 36, and each recess 50 is fitted with a wedge shaped brake element 52. The wedge shapes of the recess 50 and the brake element 52 are complementary and produce a jamming action between the brake element 52 and inner surface of the rotor wall 44, under assistance of a spring 54 when the rotor 42 is driven in one direction.

A tubular internally splined brake release member 56 is fitted inside the drive hub 36. The brake release member has a radial projection 58 engagable in a recess in the internal cylindrical wall of the drive hub 36 to limit relative movement of the brake release member relative to the drive hub. Furthermore, the brake release member has three radially outwardly facing recesses 60, into each of which an operating arm 62 projects from a respective one of the brake elements 52. A latching unit 66 is mounted relative to the stator of the motor within the splined interior of the brake release member 56 and has a latch element 68 which can be operated by a ligament 70 against the action of a return spring 72 to project into engagement with the splines 74 of the break release member 56.

The operation of the drive hub arrangement of FIG. 6 will now be described with reference to FIGS. 7A, 7B and 7C.

Figure 7A:
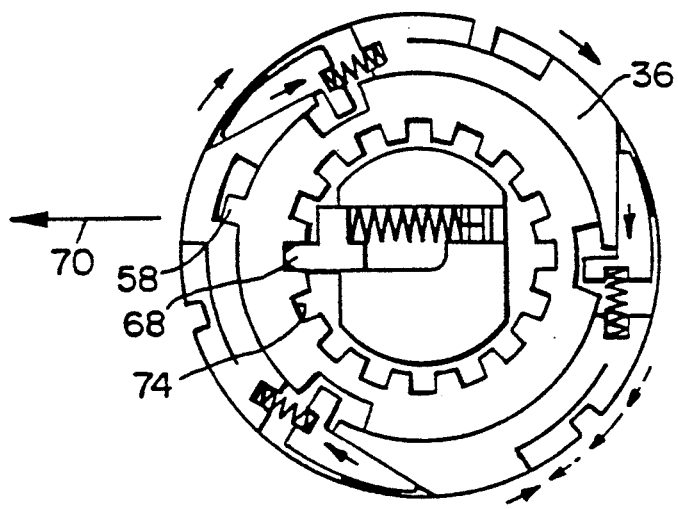
FIGS. 7A, 7B and 7C illustrate the operation of the drive hub mechanism.

Referring to FIG. 7A, and commencing with the arrangement in which the drive hub 36 is retracted into the rotor 42, in order to make the hub rise, the ligament 70 is tensioned and the rotor 42 is rotated clockwise when viewed from the underside of the drive. Tensioning the ligament 70 causes the latch element 68 to engage with the splines 74 of the brake release member 56 and thus prevents rotation of the brake release member 56. The projection 58 prevents the drive hub 36 from rotating. Relative rotation between the rotor 42 and the drive hub 36 is permitted by the brake elements 52, because the relative rotation is in a direction to tend to un-jam the brake elements. The relative rotation between the rotor 42 and the drive hub 36 causes the drive hub 36 to rise through the action between the pins 48 and the grooves 46 until the pins 48 reach the ends 74 of the grooves.

The arrangement then jams until the latch element 68 is disengaged from the splines 74 by releasing the tension on the ligament 70. Referring to FIG. 7C, upon such release, the drive hub 36 can be turned in either direction by the rotor 42. Relative rotation between the drive hub 36 and rotor 42 is prevented in one direction by engagement of the pins 48 with the ends 74 of the grooves 46, and is prevented in other direction by the jamming action of the brake elements 52 against the inner cylindrical wall of the rotor 42.

Figure 7B:
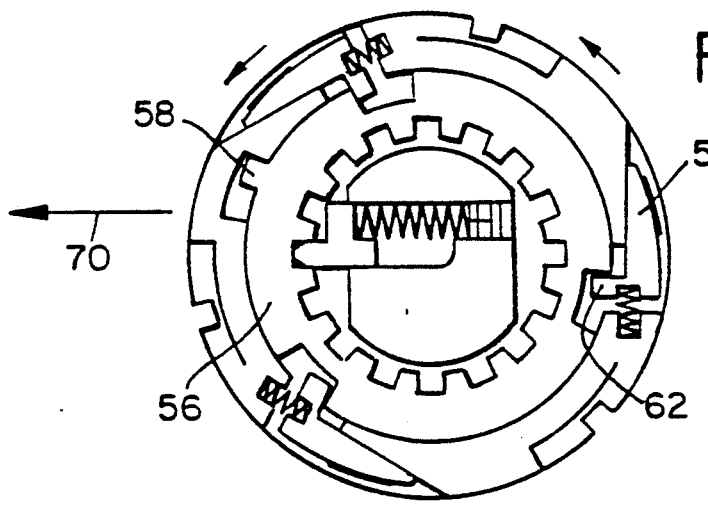
Figure 7C:
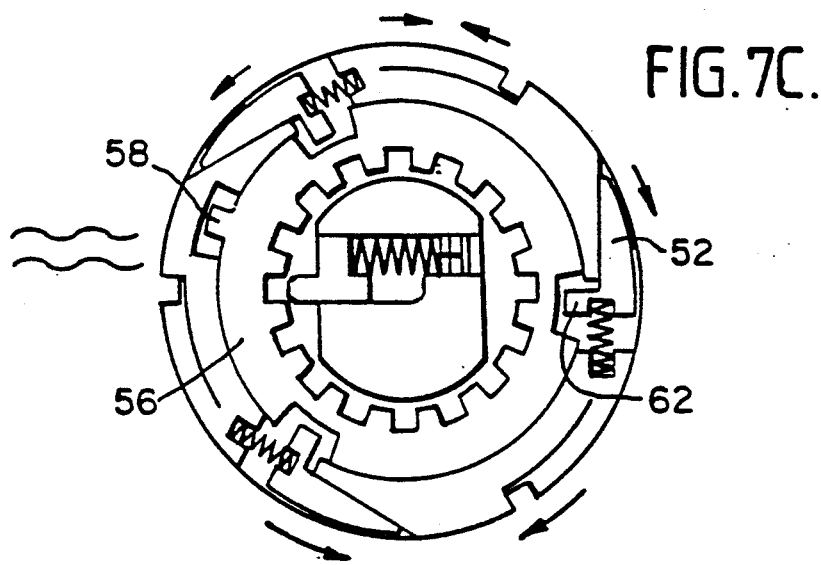

Referring to FIG. 7B, in order to retract the hub 36 into the rotor 42, the rotor is driven in the anti-clockwise direction, when viewed from the underside of the drive, and the ligament 70 is tensioned. Upon tensioning of the ligament, the latch element 68 is re-engaged with the splines 74 in the brake release member 56. Thus, the brake release member 56 is stalled. The release arms 62 on the brake elements 52 are therefore engaged by the recesses in the brake release member 56 and cause the brake elements 52 to become un-jammed from the rotor 42. Also, the projection 58 on the brake release member 56 prevents the drive hub 36 from rotating, and therefore the relative rotation between the rotor 42 and the drive hub 36 causes the drive hub 36 to be retracted into the rotor 42 until an abutment shoulder inside the brake release member 56 engages the latch unit 66 to limit the descent of the drive hub 36 and brake release member 56. The motor is then stalled until the ligament 70 is released and thus the latch element 68 is disengaged from the splines 74.

For further illustration, the operation of the drive hub mechanism is illustrated in FIGS. 8A and 8B. In the situation shown in FIG. 8A, the hub 36 has been raised, but the latch element 68 has not yet been released. In FIG. 8B, the hub 36 has been retracted, and the latch element 68 has been released. Referring to FIG. 8A, it can be seen that, once the hub has been raised, drive dogs 74 are engagable with the drive teeth of the supply reel 22 in the cartridge housing 10, and a central projection 76 on the hub is engagable with the locking button (not shown) of the cartridge 10. As also shown in FIG. 8A, the latching element 68 of the latch unit 66 may be arranged so that it is biased upwardly upon tensioning of the ligament 70 so that it can maintain engagement with the splines 74 of the brake release member 56 despite the upward movement of the drive hub 36 and the brake release member 56.

3.3 Head Indexing

Figure 9:
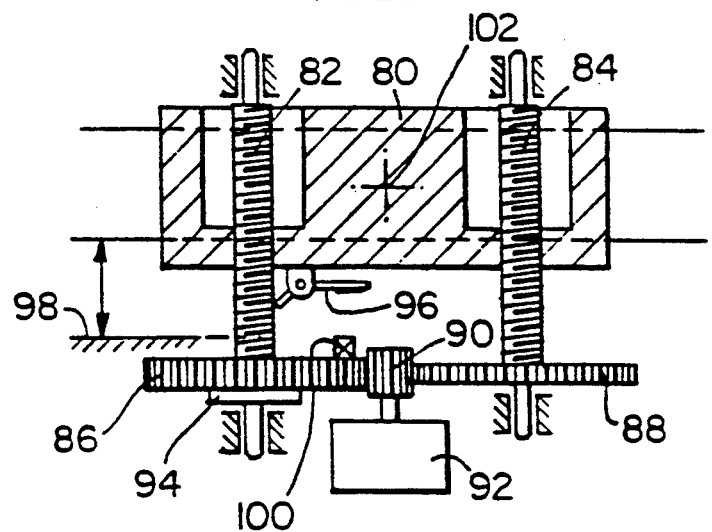
FIG. 9 is a schematic illustration of a recording head indexing mechanism.

Referring now to FIG. 9, there is illustrated schematically an arrangement for indexing a tape head across the width of a magnetic tape, and also for adjusting the azimuth angle of the head.

The head is mounted on a head mounting plate 80, which in turn is mounted on two parallel screws 82, 84. Gears 86, 88 are mounted on the screws and are driven by a common pinion 90 on a motor 92, such as a stepper motor or a DC motor and encoder. The gear 88 is directly attached to the screw 84. However, a backlash device 94 is provided between the gear 86 and its corresponding screw 82 so that the gear 86 can rotate through an angle of, for example, 30 degrees, without causing any rotation of the screw 82. Also mounted on the plate 80 is a pivoted stop lever 96, one end of which can engage a reference surface 98, and the other end of which can engage a stop pin 100 provided on the gear 86.

Figure 10A:
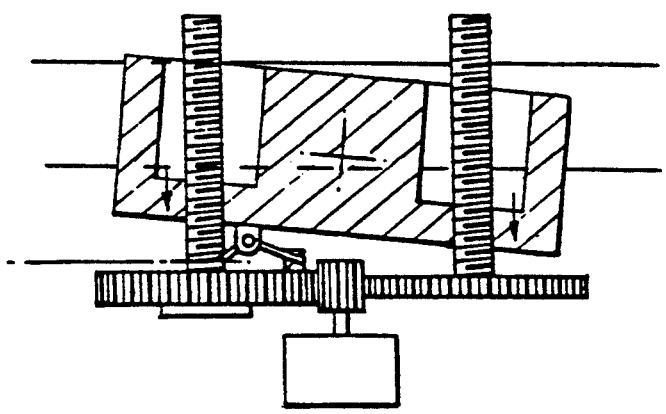
FIGS. 10A to 10E illustrate the operation of the recording head.

The operation of the mechanism will now be described with reference to FIGS. 10A to 10E. During initialisation of the tape drive machine, the motor is rotated to move the head plate 80 down the screws 82, 84 until the stop lever 96 engages the reference surface 98 and causes the other end of the stop lever 96 to swing into the path of the stop pin 100 and thus stall the motor. This situation is shown in FIG. 10A. During this operation, the backlash in the backlash device 94 will be taken up. Friction between the drive screw 82 and head mounting plate 80 ensures that motor 92 removes all backlash before the drive screw 82 moves, and prevents displacement of the head by vibrations.

Taking the example of a simple case, in which the same azimuth angle is used for movement of the tape in either direction, the number A of degrees of rotation of the stepper motor required to move the head mounting plate 80 from the initialisation position to the desired azimuth angle is remembered by a controller for the motor. If, from the position shown in FIG. 10A, the motor is caused to rotate by A degrees, then the screw 84 will rotate to raise the right hand side of the head plate 80. However, the number B of degrees of rotation of the motor necessary to take up all of the backlash in the backlash device is chosen to be greater than the number of degrees A, and therefore the screw 82 will not rotate. Therefore, from the initialisation position shown in FIG. 10A, rotating the motor by A degrees will move the head plate 80 so that the head is aligned with the first track on the tape and the azimuth angle is correct.

Figure 10B:
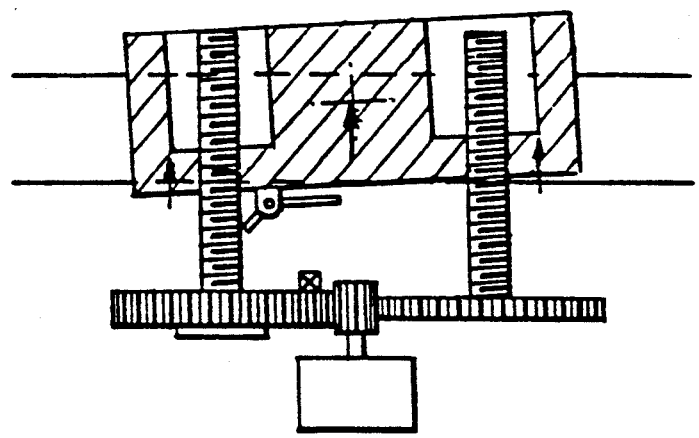
Figure 10C:
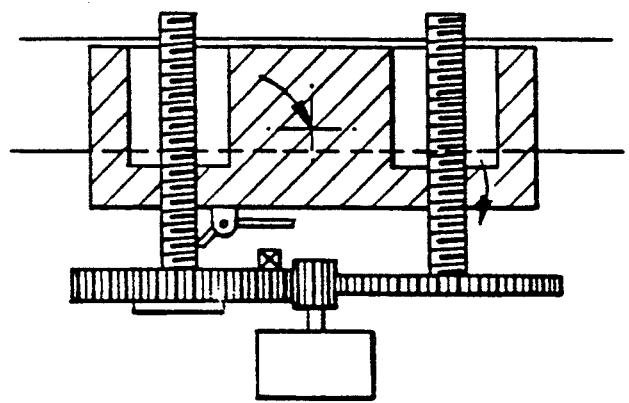

The controller for the motor is also programmed to remember the number I of degrees of rotation to move the head from one track to the next track. From the position in which the head is correctly aligned on the first track, if it is desired to move the head to the third track, firstly the motor is rotated B−A steps to take up the remainder of the backlash in the backlash device 94, only the screw 84 being rotated during this operation. Rotation of the motor is continued for a further 2×I degrees, during which time both screws 82, 84 rotate, and the screw 82 is brought to the desired position. This situation is shown in FIG. 10B. Then, the motor is rotated in the opposite direction by B−A degrees, causing only screw 84 to rotate due to the backlash device 94, and bringing the head plate to the desired azimuth angle as shown in FIG. 10C.

Figure 10D:
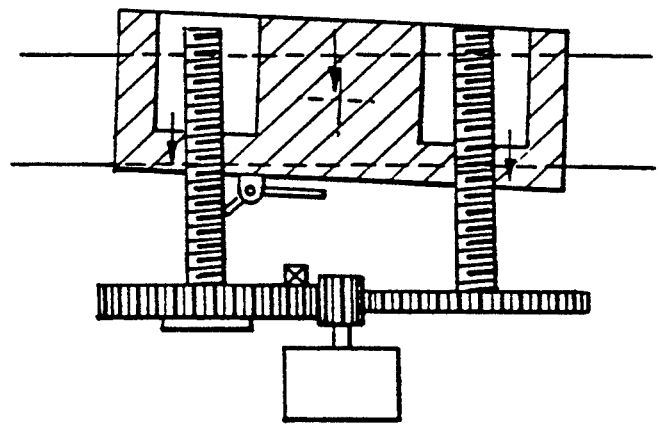
Figure 10E:
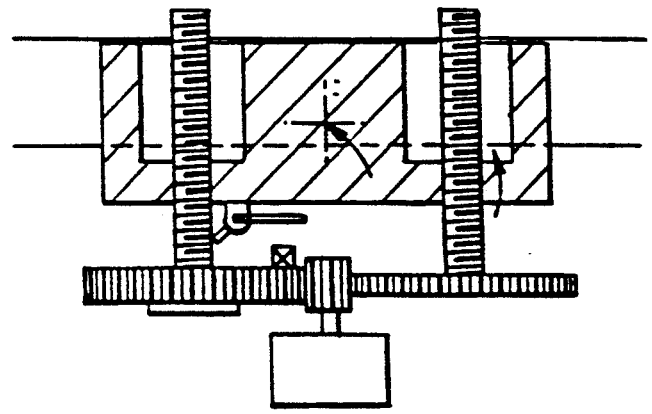

If it is then desired to move the head in the opposite direction, for example by one track from track three to track two, firstly the motor is rotated by B degrees to take up the backlash in the backlash device 94 and to cause only screw 84 to rotate. Rotation of the motor by 1×I degrees is then carried out to cause both screws 82, 84 to rotate and to bring screw 82 to the desired position, as shown in FIG. 10D. The motor is then rotated in the opposite direction by A degrees to cause only screw 84 to rotate and to bring the head plate 80 to the desired azimuth angle, as shown in FIG. 10E.

It will be appreciated that a more sophisticated control arrangement can be utilised so that differing azimuth angles can be set, depending on the direction of movement of the tape. Furthermore, the azimuth angle of the head may be easily adjusted by storing a different value of A to be used by the controller for the stepper motor 92. Furthermore, other methods to establish datums can be used.

Referring back to FIG. 9, the centre of the head with respect to the mounting plate 80 is denoted by reference numeral 102, part way between the screws 82, 84. Therefore, with varying azimuth angles, the position of the head across the width of the tape will also be altered slightly. This can be compensated for by introducing an offset into the position of the screw 82 between the initialisation position, shown in FIG. 10A and the position of the screw 82 used for reading the first track, and by varying this offset in dependence upon the set azimuth angle of the head. Alternatively, the head may be mounted on the mounting plate 80 so that it is aligned with the screw 82.

It should be noted that the variations in azimuth angle shown in FIGS. 10A to 10E have been exaggerated for the purposes of clarity.

3.4 Tape Drive Motor

Referring now to FIGS. 8A, 8B and 11 to 14, there follows a description of a motor for use in the tape drive machine. The rotor 42 of the motor comprises the cylindrical member 44 described above, and an annular flange 104 extending radially outwardly from the cylindrical member 44 at the upper end thereof. The inner raceway of a ball bearing 106 encircles the cylindrical member 44.

The stator 108 of the motor comprises a back iron 110 formed from a strip wound in a spiral. Eighteen winding coils 112 are disposed on the back iron 110 in a manner described below, and the assembly of the windings and back iron is potted in a reinforced thermosetting plastics resin to form an annular stator. A rebated bearing mounting ring 114 is provided internally of the stator assembly, and the other raceway of the single ball bearing 106 is fitted into the rebate of the ring 114.

A plurality of magnets 116 are secured to the underside of the flange 104 of the rotor to provide twelve alternating north and south poles confronting the arrangement of winding coils 112. The windings are controlled by a brushless DC motor controller integrated circuit to produce a rotating magnetic field, and accordingly the rotor 42 rotates synchronously with the magnetic field.

Figure 11:
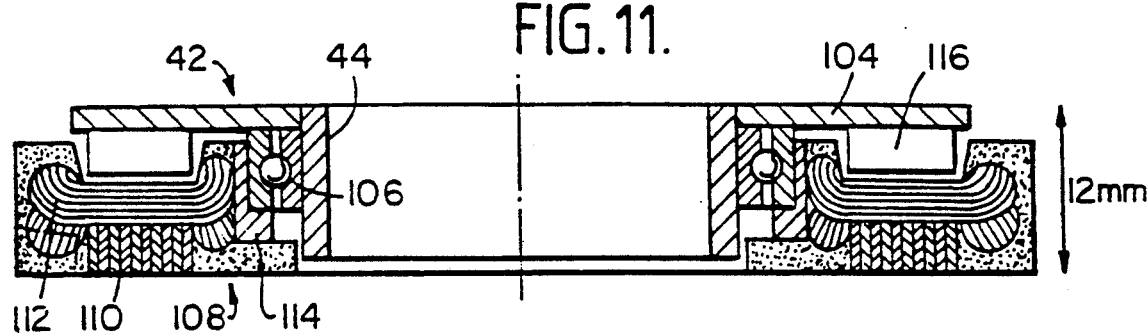
FIG. 11 is a sectional view through a motor.

It will be noted from FIG. 11 that the motor has a small axial height, by comparison to its diameter, and typically the height of the motor would be 12 mm for the application in the tape drive machine described above. The design of the low height of the motor is facilitated by the use of a single bearing for mounting the rotor to the stator. Furthermore, an important advantage of the motor is that there is an axial component to the magnetic field between the rotor and the stator, and this axial component tends to take up any play in the bearing 106, without the necessity of any other means such as a spring or shims.

The diameter of the bearing assembly is a substantial proportion, such as at least one quarter and more preferably at least about one half of the diametrical size of the motor. In one example, the balls of the bearing follow a path of diameter 52 mm and the stator assembly has an outside diameter of 98 mm. Furthermore, the balls of the bearing assembly are preferably of small diameter relative to the diameter of the path which they follow, for example in the ratio of 1:14.8. In the example where the balls follow a path of diameter 52 mm, the balls are each of diameter 3.5 mm. By making the bearing of large diameter with balls of small diameter, the amount of tilt of the rotor due to play in the bearing is small.

3.5 Stator Construction

Referring specifically to FIGS. 12 to 15, the arrangement of the winding coils 112 is illustrated. Eighteen such coils are provided and they are interconnected in a three-phase, twelve-pole arrangement. In construction of the coil assembly, each coil is initially substantially planar. The coils are laid on an annular former in two tiers in the arrangement shown in FIG. 12, and a further annular former is placed on top of the upper tier of coils. The width of the annular former is slightly less than the distance between the two circumferential portions of each coil. The two formers are then pressed together in a press in order to deform the coils so that each generally radial portion x of each coil is forced into the space between the generally circumferential portions of the adjacent coil, and thus the sections as shown in FIGS. 14 and 15 are obtained. Each coil is covered with a heat-curable lacquer, and after the pressing operation the coil assembly is heated in order to cure the lacquer coating and thus bond the coils together in a rigid ring. This manufacturing process therefore provides a compact and strong winding assembly.

The stator assembly may be formed from three or more tiers pressed together, rather than two tiers.

3.6 Detection of Tape Edge

Referring to FIGS. 17 to 19, an arrangement is illustrated for detecting one of the edges of the magnetic tape. A laser diode is disposed to one side of one edge 152 of the tape 154. The diode 150 emits a beam of light which, at the diode, is very narrow in one direction, typically 1.5 microns, and this narrow direction is arranged to correspond with the width direction of the tape. The beam of light diverges from the diode 150, and the diode is arranged so that the tape 154 partially cuts the beam of light. The light beam is directed to a photo sensor array 156. The distance x between the diode 150 and the tape 154 is chosen to be substantially less than the distance y between the tape 154 and the photo sensor array 156. In one example, the distance x is 1 mm, and the distance y is 30 mm.

Referring specifically to FIG. 18, the photo sensor array 156 comprises four photo sensitive elements 158, arranged in a two-by-two array, with the diagonals parallel to and perpendicular to the edge of the shadow 160 of the tape 154 cast by the diode 150. An arithmetic circuit 162 serves to sum the outputs of the sensor elements 1, 3, to sum the outputs of the elements 2, 4 and to provide an output dependent upon the difference between the two sums. The output therefore provides a measure of the transverse position of the tape and has a nominal zero value when the shadow of the edge 152 of the tape bisects the sensor elements 2, 4. Four sensor elements are used so that any offset in the output of each sensor element, which is likely to be the same for all four sensor elements, is self cancelling. The output from the arithmetic circuit 162 may be used in initially setting the position of the head of the tape drive. However, the output may also be dynamically used when indexing the head in the arrangement described above to compensate for any variations in the transverse position of the tape. Furthermore, in one arrangement which provides for movement of the head across the tape completely independently of azimuth adjustment of the head, the tape edge may be continuously detected and the head may be moved at any time to compensate for variations in the transverse position of the tape.

An alternative photo sensor 156 is illustrated in FIG. 19. In this case, only two sensor elements are used. Sensor element A1 is in the form of a disc, and sensor element A2 is in the form of a ring concentric with the element A1 and of the same area. A simpler arithmetic circuit can then be utilised which merely provides an output dependent upon the difference between the outputs of the sensor elements A1, A2.

In the above arrangement, by virtue of the large ratio of the distance y to the distance x, movement of the edge of the tape relative to the diode 150 and the photo sensor 156 produces a greatly amplified movement of the edge of the shadow 160 cast by the tape 154. Accordingly, the arrangement can be used to determine the position of the edge of the tape to very fine tolerances.

3.7 Detection of Beginning and End of Tape

Referring to FIG. 16, there is shown a manner of controlling the motor. The windings of the motor are arranged as three phases 118, 120, 122 in a star configuration. Each winding is connected to an output of an electronic commutator circuit 124. A generator 126 supplies a 50 kHz signal which is modulated by a pulse width modulator 128, and the pulse width modulated signal is supplied to the electronic commutator 124 for switching between the three phase outputs of the commutator 124. Hall-effect sensors 130 responsive to rotation of the rotor of the motor supply synchronising signals to a controller 132, and the controller 132 provides synchronising signals to the commutator 124 so that the pulse width modulated signal is switched to the respective phases of the windings at the appropriate times. A speed setting device 134 provides a signal to the controller 132, and the controller 132 provides a signal to the pulse width modulator 128 dependent upon the set speed and the actual speed derivable from the output of a tachometer B which can be fitted either to the motor or placed in the tape path to measure the speed, so that the pulse width is varied to regulate the speed of the motor.

It is necessary in a tape drive machine to be able to detect that the take-up reel is nearly empty, so that the motors can be halted before the end of the tape is reached, in order to prevent undue straining of the tape, or the leader block being forced out of take up reel and past the head assembly.

Referring to FIG. 16, the tachometer 133 produces a series of pulses, for example 360 pulses for each revolution of the tachometer, which are counted by the controller 132. The controller 132 also responds to an output from one of the Hall-effect sensors 130 for the take-up reel to reset the count once per revolution of the take-up reel. It will be noted that the radius R of the body of tape on the take-up reel can be determined by the value n of the count immediately before the count is reset by the equation $R = n.r/N$, where r is the radius of the tachometer 133 and N is the number of pulses produced per revolution of the tachometer 133. During fast or slow reverse winding, the controller 132 is operable repeatedly to determine whether the value n is less than a predetermined value indicating that the radius of the body of tape on the take-up reel is only slightly greater than the radius of the take-up reel, and upon such a determination is operable to stop the winding process. Thus, winding is stopped just before the beginning of tape is reached.

In a modification of the above process, the controller is also operable repeatedly to determine whether the value n is greater than a further predetermined value indicating that the radius of the body of tape on the take-up reel has reached a maximum permissible value, and to stop a forward winding process upon such a determination. The maximum permissible radius is chosen to be somewhat less than the radius which would be produced if all of the tape were wound onto the take-up reel.

Since the value of the maximum diameter of the body of tape on the take-up reel depends on the length and thickness of the tape, which may vary from one tape cartridge to another, in an alternative preferred modification the controller determines the end of tape using one of the Hall-effect sensors of the supply reel motor and can therefore determine when the radius of the body of tape remaining on the supply reel has decreased to value only slightly larger than the radius of the supply reel.

3.8 Last Turn Sensor

Referring to FIG. 20, a printed circuit board 188 for carrying electronic components of the machine is provided beneath a take-up motor 190 which drives a take-up reel 170. An infra-red source 194 is mounted at one position on the printed circuit board 188, and an infra-red detector 192 is mounted at another position. The infra-red source 194 projects a beam upwardly through a passageway 204 in the motor and a passageway 202 in the boss 172 to a reflective surface 200. The beam is reflected by the surface 200 into a part-chordal passageway 198 in the boss 172 of the take-up reel 170, and passes to a mirror 196 provided on a mounting plate 186, which directs the beam downwardly through onto the infra-red detector 192. The beam will only follow this path when the take-up hub 170 is in a position in which the passageway 198 is aligned with the mirror 196 and when the passageway 202 is in register with the passageway 204 and when there is slightly less than one turn of tape on the take-up reel 170. If there is more tape than this, then it will be appreciated that the exit from the passageway 198 is covered by the tape.

It will be appreciated that the above arrangement enables the electronic components, that is the infra-red source and infra-red detector to be mounted directly on a main circuit board 188 of the tape drive machine.

We claim:

1. A tape drive for a tape cartridge (10) of the type having a generally flat cartridge housing with top and bottom faces (12, 14) and a peripheral edge (16) extending between the top and bottom faces and a drive hub receiving member (22) accessible through the bottom face of the housing, the tape drive comprising:

a drive housing (30);

means to hold such a cartridge in an operating position in the drive housing;

a drive hub (36) arranged to engage the drive hub receiving member of such a cartridge in the operating position;

an electric motor (34) arranged to drive the hub; and means (46, 48) to retract the drive hub out of engagement with the hub receiving member to permit the cartridge to be withdrawn from the operating position substantially by sliding movement in an edgewise direction of the cartridge;

characterized in that:

the motor has a main body (34) disposed in the drive housing directly beneath the cartridge when in the operating position, the main body having a cavity; and the drive hub is retractable from a position (FIGS. 3, 8A) projecting from the motor body into engagement with the hub receiving member of the cartridge to a position (FIGS. 4, 8B) retracted into the motor body that said drive hub is substantially, entirely contained within said cavity whereby the drive hub does not project substantially from the motor body and is clear of the cartridge.

2. A tape drive as claimed in claim 1, wherein the housing (30) is adapted to receive a cartridge having nominal dimensions of 127 mm (5") long, 102 mm (4") wide and 25 mm (1") high.

3. A tape drive as claimed in claim 2, wherein the housing is adapted to receive a cartridge according to specification IBM GS 32-0048-0, ECMA 120, ANSI×3B5-87-037, or a substantially equivalent specification.

4. A tape drive as claimed in claim 1, wherein the drive has overall dimensions of substantially 83 mm (3.25") high, 146 mm (5.75") wide and not greater than 203 mm (8") long.

5. A mechanism as claimed in claim 1, wherein the means to retract the drive hub comprises at least one projection on one of the rotor and the hub engaging in a complementary groove in the other of the rotor and the hub.

6. A mechanism as claimed in claim 1, wherein the means to retract the drive hub comprises at least one pair of grooves in the hub and rotor respectively, and a rolling transmission element engaging both grooves of the pair.

7. A drive mechanism for a tape drive machine, comprising a motor (34) having a rotor (42), a tape reel drive hub (36) arranged to be driven by the motor and for engaging and driving a tape reel in the tape drive machine, means (46, 48) to cause the hub to move in axial directions between first and second opposite axial positions (FIG. 8A, FIG. 8B), and means (52) selectable to lock the hub in at least the first axial position, characterized in that the rotor is annular, the hub is mounted within the rotor, the movement causing means is operable to cause the movement between the first and second opposite axial positions in response to relative rotation of the hub and rotor in first and second opposite directions, and the locking means is operable to permit rotary drive to be transferred from the rotor to the hub when the hub is in the first axial position.

8. A mechanism as claimed in claim 7, wherein the hub projects from the rotor in the first position (FIG. 8A) and is retracted into the rotor in the second position (FIG. 8B).

9. A mechanism as claimed in claim 8 wherein the means to cause the hub to move axially comprises a screw thread (46) or the like acting between the hub and the rotor.

10. A mechanism as claimed in claim 8 wherein the hub is prevented from moving past the first axial position from the second axial position with respect to the rotor, and wherein the locking means comprises a brake (52) operable to prevent relative rotation between the hub and the rotor in the direction which would cause the hub to move from the first to the second axial position with respect to the rotor.

11. A mechanism as claimed in claim 7 wherein the means to cause the hub to move axially comprises a screw thread (46) or the like acting between the hub and the rotor.

12. A mechanism as claimed in claim 11, wherein the means for causing the hub to move axially comprises at least one projection (48) on one of the rotor and the hub engaging in a complementary groove (46) in the other of the rotor and the hub.

13. A mechanism as claimed in claim 12 wherein the hub is prevented from moving past the first axial position from the second axial position with respect to the rotor, and wherein the locking means comprises a brake (52) operable to prevent relative rotation between the hub and the rotor in the direction which would cause the hub to move from the first to the second axial position with respect to the rotor.

14. A mechanism as claimed in claim 11, wherein the means to cause the hub to move axially comprises at least one pair of grooves in the hub and rotor respectively, and a rolling transmission element engaging both grooves of the pair.

15. A mechanism as claimed in claim 14, wherein the hub is prevented from moving past the second axial position and the first axial position with respect to the rotor, and wherein the locking means comprises a brake operable to prevent relative rotation between the hub and the rotor in the direction which would cause the hub to move from the first to the second axial position with respect to the rotor.

16. A mechanism as claimed in claim 14 wherein the hub is prevented from moving past the first axial position from the second axial position with respect to the rotor, and wherein the locking means comprises a brake (52) operable to prevent relative rotation between the hub and the rotor in the direction which would cause the hub to move from the first to the second axial position with respect to the rotor.

17. A mechanism as claimed in claim 11 wherein the hub is prevented from moving past the first axial position from the second axial position with respect to the rotor, and wherein the locking means comprises a brake (52) operable to prevent relative rotation between the hub and the rotor in the direction which would cause the hub to move from the first to the second axial position with respect to the rotor.

18. A mechanism as claimed in claim 7 wherein the hub is prevented from moving past the first axial position from the second axial position with respect to the rotor, and wherein the locking means comprises a brake (52) operable to prevent relative rotation between the hub and the rotor in the direction which would cause the hub to move from the first to the second axial position with respect to the rotor.

19. A tape drive for a tape cartridge (10) of the type having a generally flat cartridge housing with top and bottom faces (12, 14) and a peripheral edge (16) extending between the top and bottom faces and a drive hub receiving member (22) accessible through the bottom face of the housing, the tape drive comprising:

a drive housing;

means to hold such a cartridge in an operating position in the drive housing; and a drive mechanism mounted in the drive housing, the device mechanism comprising a motor (34) having a motor body (34), an annular rotor (42), a tape reel drive hub (36) mounted within the rotor and arranged to be driven by the motor, means (46, 48) to cause the hub to move in opposite axial directions between a first axial position projecting from the motor body for engagement with the drive hub receiving member of the cartridge and a second axial position in which the drive hub does not project from the motor body, and means (52) selectable to the lock the hub in at least the first axial position, the movement causing means being operable to cause the movement in the opposite axial directions in response to relative rotation of the hub and rotor in first and second opposite directions of rotation, and the locking means being operable to permit rotary drive to be transferred from the rotor to the hub when the hub is in the first axial position.

* * * * *